United States Patent
Chen et al.

(10) Patent No.: US 10,856,324 B2
(45) Date of Patent: Dec. 1, 2020

(54) SCHEDULING METHOD AND DEVICE

(71) Applicant: Huawei Technologies Co., Ltd., Shenzhen (CN)

(72) Inventors: Yan Chen, Chengdu (CN); Jianjun Yang, Shenzhen (CN); Xiongshu Yi, Chengdu (CN); Feixiang Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/404,412

(22) Filed: May 6, 2019

(65) Prior Publication Data
US 2019/0261409 A1 Aug. 22, 2019

Related U.S. Application Data

(63) Continuation of application No. PCT/CN2016/104706, filed on Nov. 4, 2016.

(51) Int. Cl.
| | |
|---|---|
| *H04W 4/00* | (2018.01) |
| *H04W 72/14* | (2009.01) |
| *H04L 5/14* | (2006.01) |
| *H04W 8/24* | (2009.01) |
| *H04W 72/04* | (2009.01) |
| *H04W 72/12* | (2009.01) |

(52) U.S. Cl.
CPC ............ *H04W 72/14* (2013.01); *H04L 5/14* (2013.01); *H04W 8/24* (2013.01); *H04W 72/042* (2013.01); *H04W 72/0446* (2013.01); *H04W 72/1263* (2013.01); *H04W 72/1278* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 9,020,515 B2 | 4/2015 | Choi et al. | |
| 2015/0312905 A1* | 10/2015 | Seo | H04B 7/2656 370/280 |
| 2017/0170944 A1* | 6/2017 | Ang | H04W 72/042 |
| 2018/0302810 A1* | 10/2018 | Fujishiro | H04W 76/28 |

(Continued)

FOREIGN PATENT DOCUMENTS

| | | |
|---|---|---|
| CN | 102158978 A | 8/2011 |
| CN | 103906242 A | 7/2014 |

(Continued)

OTHER PUBLICATIONS

Chinese Office Action and Search Report for corresponding CN201680090435.7, dated May 6, 2020.

*Primary Examiner* — Phirin Sam

(57) ABSTRACT

This application relates to a scheduling method and a device. In the scheduling method, a base station sends, at a first moment, uplink grant (UL GRANT) information to a terminal that is to perform uplink data transmission; the base station sends, at a second moment, downlink data to a terminal that is determined by the base station and that is to perform downlink data transmission, where the second moment is a moment at which the terminal that is to perform uplink data transmission sends uplink data after receiving the uplink grant information at the first moment.

8 Claims, 7 Drawing Sheets

S201. A base station sends, at a first moment, uplink grant (UL GRANT) information to a terminal that is to perform uplink data transmission S202. The base station sends, at a second moment, downlink data to a terminal that is to perform downlink data transmission, where the second moment is a moment at which the terminal that is to perform uplink data transmission sends uplink data after receiving the uplink grant information at the first moment

(56) References Cited

U.S. PATENT DOCUMENTS

| | | | | |
|---|---|---|---|---|
| 2018/0332478 A1* | 11/2018 | Noh | ............ | H04L 5/0053 |
| 2019/0037600 A1* | 1/2019 | Urabayashi | ............ | H04W 76/15 |
| 2019/0254061 A1* | 8/2019 | Manolakos | ............ | H04L 5/0051 |
| 2019/0342909 A1* | 11/2019 | Lee | ............ | H04W 72/04 |
| 2019/0357190 A1* | 11/2019 | Park | ............ | H04L 27/0006 |
| 2020/0213055 A1* | 7/2020 | Kim | ............ | H04W 8/24 |
| 2020/0220697 A1* | 7/2020 | Lee | ............ | H04W 24/08 |

FOREIGN PATENT DOCUMENTS

| | | |
|---|---|---|
| CN | 106034097 A | 10/2016 |
| WO | 2011020351 A1 | 2/2011 |

\* cited by examiner

S201. A base station sends, at a first moment, uplink grant (UL GRANT) information to a terminal that is to perform uplink data transmission S202. The base station sends, at a second moment, downlink data to a terminal that is to perform downlink data transmission, where the second moment is a moment at which the terminal that is to perform uplink data transmission sends uplink data after receiving the uplink grant information at the first moment

FIG. 2

S301. A first terminal receives, at a first moment, downlink control information sent by a base station S302. The first terminal receives, at a second moment, downlink data sent by the base station, where the second moment is a moment at which a second terminal sends uplink data after receiving, at the first moment, uplink grant information sent by the base station, and the first terminal and the second terminal are terminals that are to perform uplink data transmission and downlink data transmission at a same moment and a same frequency

FIG. 3

S401. A first terminal receives, at a first moment, downlink control information sent by a base station, where the downlink control information includes indication information S402. The first terminal determines, according to the indication information, to receive, at a second moment, downlink data sent by the base station, where the second moment is a moment at which a second terminal sends uplink data after receiving, at the first moment, uplink grant information sent by the base station, and the first terminal and the second terminal are terminals that are determined by the base station and that are to perform uplink data transmission and downlink data transmission at a same moment and a same frequency

FIG. 4

S501. A first terminal receives, at a first moment, downlink control information sent by a base station, where the downlink control information includes indication information, and the indication information is used to instruct to receive downlink data in an $n^{th}$ subframe after a current subframe S502. The first terminal receives the downlink data in the $n^{th}$ subframe, where the $n^{th}$ subframe is determined by the base station based on a second moment at which a second terminal sends uplink data after receiving, at the first moment, uplink grant information sent by the base station, and the first terminal and the second terminal are terminals that are to perform uplink data transmission and downlink data transmission at a same moment and a same frequency

FIG. 5

S801. A base station sends, at a first moment, uplink grant information to a terminal that is to perform uplink data transmission, and simultaneously sends downlink control information to a terminal that is to perform downlink data transmission, where the downlink control information includes indication information, and the indication information is used to instruct to receive data in an $n^{th}$ subframe after a current subframe S802. After receiving the downlink control information, the terminal that is to perform downlink data transmission receives the data in the $n^{th}$ subframe after the current subframe according to the indication information in the downlink control information

FIG. 8

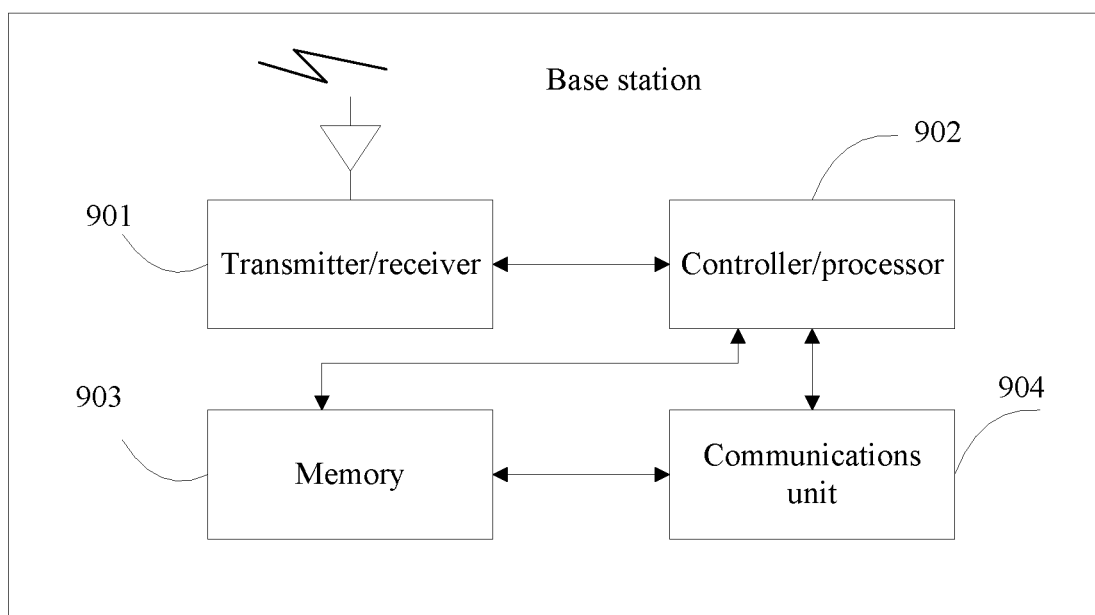

FIG. 9

SCHEDULING METHOD AND DEVICE

CROSS-REFERENCE TO RELATED APPLICATIONS

This application is a continuation of International Patent Application No. PCT/CN2016/104706, filed on Nov. 4, 2016, the disclosure of which is hereby incorporated by reference in its entirety.

TECHNICAL FIELD

This application relates to the field of mobile communications technologies, and in particular, to a scheduling method and a device.

BACKGROUND

In a frequency division duplex (FDD) communications technology, different frequencies are used for uplink communication and downlink communication, and in a time division duplex (TDD) communications technology, different slots are used for uplink communication and downlink communication.

Being different from the foregoing FDD communications technology and TDD communications technology, in a full duplex (FD) technology, uplink communication and downlink communication can be performed in a same slot and at a same frequency, so that spectrum resource utilization is doubled.

In the FDD/TDD communications technology, advance pre-decision scheduling is used for uplink scheduling, that is, a base station makes a scheduling decision and delivers control information at a moment t1, and a terminal subsequently transmits uplink data at a moment t2; and real-time scheduling is used in a downlink direction, that is, the base station makes a scheduling decision and delivers control information and user data to the terminal at the moment t1.

In the FD technology, because uplink resource transmission and downlink resource transmission need to be performed in a same slot and at a same frequency, the base station determines terminals that are to simultaneously perform uplink transmission and downlink transmission, and needs to ensure that the determined terminals that are to perform uplink transmission and downlink transmission perform uplink data transmission and downlink data transmission at a same moment. However, according to a process in the FDD/TDD communications technology, uplink data transmission needs to be performed at a time delayed after the terminal receives the control information, and consequently it cannot be ensured that the terminals that are determined by the base station and that are to perform uplink transmission and downlink transmission perform data transmission in a same slot and at a same frequency.

SUMMARY

A scheduling method and a device are described in this application, to save spectrum resources.

According to one aspect, an embodiment of this application provides a scheduling method. The method includes: sending, by a base station at a first moment, uplink grant (UL GRANT) information to a terminal that is to perform uplink data transmission; and sending, by the base station at a second moment, downlink data to a terminal that is to perform downlink data transmission, where the second moment is a moment at which the terminal that is to perform uplink data transmission sends uplink data after receiving the uplink grant information at the first moment. In this way, the base station can send data to or receive data from, at a same moment, the terminal that is to perform uplink data transmission and the terminal that is to perform downlink data transmission, to ensure that the base station can perform uplink data transmission and downlink data transmission with the terminals at a same moment and a same frequency, thereby improving spectrum utilization and saving resources.

In a possible design, the base station sends, at the second moment, downlink control information to the terminal that is to perform downlink data transmission. The base station may simultaneously send the downlink control information and the downlink data to the terminal that is to perform downlink data transmission.

In a possible design, the base station sends, at the first moment, downlink control information to the terminal that is to perform downlink data transmission, where the downlink control information includes indication information, and the indication information is used to indicate at least one of the following content: information used to indicate that the terminal that is to perform uplink data transmission is a terminal having a full-duplex capability, or information used to indicate that the terminal that is determined by the base station and that is to perform downlink data transmission is in a full-duplex state. In this way, the base station adds the indication information to the downlink control information, to indicate the full-duplex state. The terminal receiving the downlink control information may determine, according to the indication information, a moment at which downlink data transmission is to be performed, so that the moment at which downlink data transmission is to be performed is consistent with a moment at which the terminal that is to perform uplink transmission performs uplink transmission, to ensure that the base station can perform uplink data transmission and downlink data transmission with the terminals at a same moment and a same frequency, thereby improving spectrum utilization and saving resources.

In a possible design, the base station sends, at the first moment, downlink control information to the terminal that is to perform downlink data transmission, where the downlink control information includes indication information, and the indication information is used to indicate an uplink-downlink part configuration relationship of a subframe for the terminal that is to perform uplink data transmission. In this way, the terminal that is to perform downlink data transmission can determine, according to the uplink-downlink part configuration relationship that is in the indication information and that is of the subframe for the terminal that is to perform uplink data transmission, a moment at which downlink data transmission is to be performed, so that the moment at which downlink data transmission is to be performed is consistent with a moment at which the terminal that is to perform uplink transmission performs uplink transmission, to ensure that the base station can perform uplink data transmission and downlink data transmission with the terminals at a same moment and a same frequency, thereby improving spectrum utilization and saving resources.

In a possible design, the uplink-downlink part configuration relationship of the subframe includes a configuration relationship between a part used for downlink data transmission and a part used for uplink data transmission in the subframe. In this way, the uplink-downlink part configuration relationship of the subframe may indicate seven configurations of subframes in a TDD system, or a subframe used for uplink transmission or a subframe used for downlink transmission in an FDD system; or the uplink-downlink part configuration relationship of the subframe may be used to indicate an FD subframe configuration used in an FD system. In this way, the moment at which downlink data transmission is to be performed can be determined based on the uplink-downlink part configuration relationship that is in the indication information and that is of the for the terminal that is to perform uplink data transmission, so that the moment at which downlink data transmission is to be performed is consistent with the moment at which the terminal that is to perform uplink transmission performs uplink transmission, to ensure that the base station can perform uplink data transmission and downlink data transmission with the terminals at a same moment and a same frequency, thereby improving spectrum utilization and saving resources.

In a possible design, the indication information is further used to indicate at least one of the following content: information further used to indicate that the terminal that is to perform uplink data transmission is a terminal having a full-duplex capability; or information further used to indicate that the terminal that is to perform downlink data transmission is in a full-duplex state.

In a possible design, the base station sends, at the first moment, downlink control information to the terminal that is to perform downlink data transmission, where the downlink control information includes indication information, and the indication information is used to instruct to receive the downlink data in an $n^{th}$ subframe after a current subframe. In this way, the terminal that is to perform downlink data transmission receives the downlink data in the $n^{th}$ subframe, so that a moment at which downlink data transmission is to be performed is consistent with a moment at which the terminal that is to perform uplink transmission performs uplink transmission, to ensure that the base station can perform uplink data transmission and downlink data transmission with the terminals at a same moment and a same frequency, thereby improving spectrum utilization and saving resources.

In a possible design, the terminal that is to perform uplink transmission and the terminal that is to perform downlink transmission are a same terminal that performs uplink transmission and downlink transmission at a same moment and a same frequency, namely, a terminal having a full-duplex capability; or terminals that are determined by the base station and that perform uplink transmission and downlink transmission at a same moment and a same frequency are two terminals, one of the two terminals is to perform uplink transmission, and the other terminal is to perform downlink transmission.

According to another aspect, an embodiment of this application provides a scheduling method. The method includes: receiving, by a first terminal at a first moment, downlink control information sent by a base station; and receiving, by the first terminal at a second moment, downlink data sent by the base station, where the second moment is a moment at which a second terminal sends uplink data after receiving, at the first moment, uplink grant information sent by the base station, and the first terminal and the second terminal are terminals that are to perform uplink data transmission and downlink data transmission at a same moment and a same frequency. In this way, a terminal that is to perform downlink data transmission and a terminal that is to perform uplink data transmission perform uplink data transmission and downlink data transmission at a same moment and a same frequency, thereby effectively improving spectrum utilization and saving resources.

According to still another aspect, an embodiment of this application provides a scheduling method. The method includes: receiving, by a first terminal at a first moment, downlink control information sent by a base station, where the downlink control information includes indication information; and determining, by the first terminal according to the indication information, to receive, at a second moment, downlink data sent by the base station, where the second moment is a moment at which a second terminal sends uplink data after receiving, at the first moment, uplink grant information sent by the base station, and the first terminal and the second terminal are terminals that are to perform uplink data transmission and downlink data transmission at a same moment and a same frequency. In this way, a terminal that is to perform downlink data transmission and a terminal that is to perform uplink data transmission perform uplink data transmission and downlink data transmission at a same moment and a same frequency, thereby effectively improving spectrum utilization and saving resources.

In a possible design, the indication information is used to indicate at least one of the following content: information used to indicate that the second terminal is a terminal having a full-duplex capability, or information used to indicate that the first terminal is in a full-duplex state; and the determining, by the first terminal according to the indication information, to receive, at a second moment, downlink data sent by the base station includes: determining, by the first terminal based on a time interval between a moment for receiving the uplink grant information by using a full-duplex FD subframe and a moment for performing uplink data transmission, to receive, at the second moment, the downlink data sent by the base station. The base station determines, based on the full-duplex state indicated by the indication information and based on the time interval between the moment for receiving the uplink grant information by using the FD subframe and the moment for performing the uplink data transmission, a moment for receiving the downlink data, and the determined moment for receiving the downlink data is a moment at which the terminal that is to perform uplink data transmission sends uplink data. In this way, the terminal that is to perform downlink data transmission and the terminal that is to perform uplink data transmission perform uplink data transmission and downlink data transmission at a same moment and a same frequency, thereby effectively improving spectrum utilization and saving resources.

In a possible design, the indication information is used to indicate an uplink-downlink part configuration relationship of a subframe in which the second terminal is to perform data transmission, where the uplink-downlink part configuration relationship of the subframe includes a configuration relationship between a part used for downlink data transmission and a part used for uplink data transmission in the subframe; and the determining, by the first terminal according to the indication information, to receive, at a second moment, downlink data sent by the base station includes: determining, by the first terminal according to the indication information, a time interval between a current subframe and a subframe in which data transmission is to be performed, and determining to receive, at the second moment, the downlink data sent by the base station. In this way, the terminal that is to perform downlink data transmission determines, based on the received uplink-downlink configuration relationship of the subframe for the terminal that is to perform uplink data transmission, a moment for receiving the downlink data, so that the terminal that is to perform downlink data transmission and the terminal that is to perform uplink data transmission perform uplink data transmission and downlink data transmission at a same moment and a same frequency, thereby effectively improving spectrum utilization and saving resources.

In a possible design, the indication information is further used to indicate at least one of the following content: information further used to indicate that the terminal that is determined by the base station and that is to perform uplink data transmission is a terminal having a full-duplex capability; or information further used to indicate that the terminal that is determined by the base station and that is to perform downlink data transmission is in a full-duplex state.

In another possible design, the indication information is used to instruct to receive the downlink data in an $n^{th}$ subframe after a current subframe.

In another possible design, the first terminal may further obtain, according to the indication information, a transmission direction of a current subframe of the first terminal and a transmission direction of a subframe in which data transmission is to be performed.

According to yet another aspect, an embodiment of this application provides a scheduling method. The method includes: receiving, by a first terminal at a first moment, downlink control information sent by a base station, where the downlink control information includes indication information, and the indication information is used to instruct to receive downlink data in an $n^{th}$ subframe after a current subframe; and receiving, by the first terminal, the downlink data in the $n^{th}$ subframe, where the $n^{th}$ subframe is determined by the base station based on a second moment at which a second terminal sends uplink data after receiving, at the first moment, uplink grant information sent by the base station, and the first terminal and the second terminal are terminals that are determined by the base station and that are to perform uplink data transmission and downlink data transmission at a same moment and a same frequency.

According to still yet another aspect, an embodiment of this application provides a base station, where the base station has a function of implementing behavior of a base station in the foregoing method designs. The function may be implemented by using hardware, or may be implemented by using hardware executing corresponding software. The hardware or the software includes one or more modules corresponding to the function.

In a possible design, a structure of the base station includes a processor and a transceiver. The processor is configured to support the base station in performing corresponding functions in the foregoing methods. The transceiver is configured to support communication between the base station and UE, and send information or an instruction mentioned in the foregoing methods to the UE, or receive information or an instruction mentioned in the foregoing methods from the UE. The base station may further include a memory, and the memory is configured to be coupled to the processor and store data and a program instruction that are necessary for the base station.

In a possible design, the base station includes: a processing module, configured to determine terminals that are to perform uplink data transmission and downlink data transmission at a same moment and a same frequency; and a sending module, configured to send, at a first moment, uplink grant (UL GRANT) information to the terminal that is determined by the base station and that is to perform uplink data transmission. The sending module is further configured to send, at a second moment, downlink data to the determined terminal that is to perform downlink data transmission, where the second moment is a moment at which the terminal that is to perform uplink data transmission sends uplink data after receiving the uplink grant information at the first moment.

According to a further aspect, an embodiment of this application provides a terminal. The terminal has a function of implementing behavior of terminal in the foregoing method designs. The function may be implemented by using hardware, or may be implemented by using hardware executing corresponding software. The hardware or the software includes one or more modules corresponding to the function. The module may be software and/or hardware.

In a possible design, a structure of the terminal includes a processor and a transceiver. The processor is configured to support the terminal in performing corresponding functions in the foregoing methods. The transceiver is configured to: support communication between the terminal and a base station, and send information or an instruction mentioned in the foregoing methods to the base station. The terminal may further include a memory, and the memory is configured to be coupled to the processor and store data and a program instruction that are necessary for the terminal.

In a possible design, the terminal is a first terminal, and includes a receiving module, configured to receive, at a first moment, downlink control information sent by a base station. The receiving module is further configured to receive, at a second moment, downlink data sent by the base station, where the second moment is a moment at which a second terminal sends uplink data after receiving, at the first moment, uplink grant information sent by the base station, and the first terminal and the second terminal are terminals that are determined by the base station and that are to perform uplink data transmission and downlink data transmission at a same moment and a same frequency.

In another possible design, the terminal is a first terminal, and includes: a receiving module, configured to receive, at a first moment, downlink control information sent by a base station, where the downlink control information includes indication information; and a processing module, configured to determine, according to the indication information, to receive, at a second moment, downlink data sent by the base station, where the second moment is a moment at which a second terminal sends uplink data after receiving, at the first moment, uplink grant information sent by the base station, and the first terminal and the second terminal are terminals that are determined by the base station and that are to perform uplink data transmission and downlink data transmission at a same moment and a same frequency.

In another possible design, the terminal is a first terminal, and includes a receiving module, configured to receive, at a first moment, downlink control information sent by a base station, where the downlink control information includes indication information, and the indication information is used to instruct to receive downlink data in an $n^{th}$ subframe after a current subframe. The receiving module is further configured to receive the downlink data in the $n^{th}$ subframe, where the $n^{th}$ subframe is determined by the base station based on a second moment at which a second terminal sends uplink data after receiving, at the first moment, uplink grant information sent by the base station, and the first terminal and the second terminal are terminals that are determined by the base station and that are to perform uplink data transmission and downlink data transmission at a same moment and a same frequency.

According to a still further aspect, an embodiment of this application provides a computer storage medium, configured to store a computer software instruction used by the foregoing base station, where the computer software instruction includes a program designed for executing the foregoing aspects.

According to a yet further aspect, an embodiment of this application provides a computer storage medium, configured to store a computer software instruction used by the foregoing terminal, where the computer software instruction includes a program designed for executing the foregoing aspects.

Compared with the prior art, the solutions provided in this application can improve spectrum utilization and save resources.

BRIEF DESCRIPTION OF DRAWINGS

FIG. 2 shows a scheduling method according to an embodiment of this application;

FIG. 3 shows a scheduling method according to an embodiment of this application;

FIG. 4 shows a scheduling method according to an embodiment of this application;

FIG. 5 shows a scheduling method according to an embodiment of this application;

FIG. 8 shows a scheduling method according to an embodiment of this application;

FIG. 9 is a possible schematic structural diagram of a base station related to the foregoing embodiments;

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

A network architecture and a service scenario described in the embodiments of this application are intended to describe the technical solutions in the embodiments of this application more clearly, but are not construed as a limitation on the technical solutions provided in the embodiments of this application. A person of ordinary skill in the art may understand that, as network architectures evolve and new service scenarios emerge, the technical solutions provided in the embodiments of this application are also applicable to similar technical problems.

To facilitate understanding of the embodiments of this application, the following describes this application in detail with reference to the accompanying drawings and the embodiments.

Figure 1A:
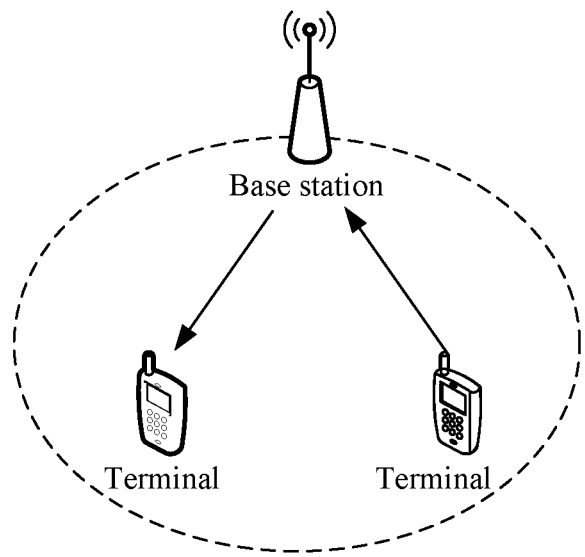
FIG. 1a and FIG. 1b are network architecture diagrams according to an embodiment of this application.
Figure 1B:
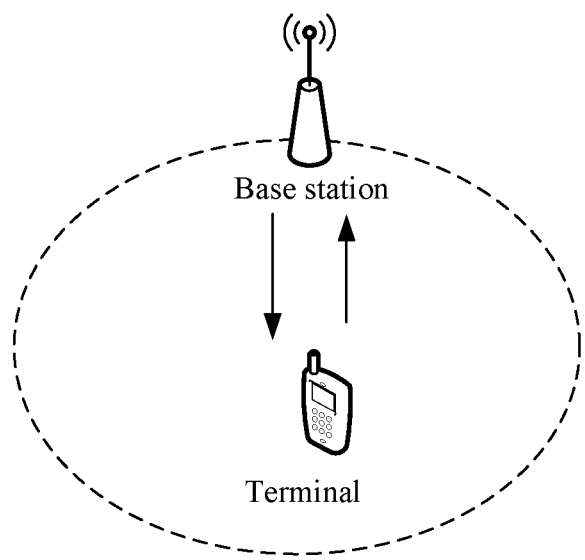

FIG. 1a and FIG. 1b are network architecture diagrams according to an embodiment of this application.

A base station is directly or indirectly connected to terminals that are to perform uplink transmission and downlink transmission at a same moment and a same frequency.

The terminals that are to perform uplink transmission and downlink transmission may be two terminals, and the two terminals perform uplink transmission and downlink transmission at a same moment and a same frequency, as shown in FIG. 1a.

Alternatively, the terminals that are to perform uplink transmission and downlink transmission may be a same terminal having a full-duplex capability, and the terminal may perform uplink transmission and downlink transmission at a same moment and a same frequency, as shown in FIG. 1b. This is not limited in this application.

The base station delays sending of downlink data information to a terminal that is to perform downlink data transmission, so that a terminal that is to perform uplink data transmission and the terminal that is to perform downlink data transmission perform uplink transmission and downlink transmission at a same moment and a same frequency, thereby improving spectrum utilization and saving resources.

The technical solutions in this application may be applicable to wireless communications systems that use various radio access technologies, for example, systems that use access technologies such as Frequency Division Multiple Access, Time Division Multiple Access, and Code Division Multiple Access. The systems include but are not limited to the following wireless communications systems: a Global System for Mobile Communications (GSM for short), a general packet radio service (GPRS for short) system, a Code Division Multiple Access (CDMA for short) system, a CDMA 2000 system, a Wideband Code Division Multiple Access (WCDMA for short) system, a Worldwide Interoperability for Microwave Access (WiMAX for short) system, a Long Term Evolution (LTE for short) system, a subsequent system such as a 5th Generation (5G) system evolved from the LTE system, and the like.

In this application, the terms "network" and "system" are usually interchangeably used, and a person of ordinary skill in the art may understand their meanings.

A base station (BS for short) related in this application is an apparatus that is deployed in a radio access network, to provide a wireless communication function for a terminal. The base station may be a macro base station, a micro base station, a repeater station, an access point, or the like in various forms. In systems that use different radio access technologies, a name of a device having a base station function may vary. For example, in an LTE network, the device is referred to as an evolved NodeB (eNB or eNodeB); and in a 3rd Generation (3G) network, the device is referred to as a NodeB. For ease of description, in this application, all the foregoing apparatuses that provide a wireless communications function for the terminal are referred to as base stations or BSs.

The terminal in this application may be a handheld device, an in-vehicle device, a wearable device, or a computing device that provides a wireless communications function; another processing device connected to a wireless modem; or user equipment (UE) in various forms, including a mobile station (MS), terminal equipment, or the like.

FIG. 2 shows a scheduling method according to an embodiment of this application, and a base station and a terminal that are based on the method. For steps in this embodiment, reference may be made to corresponding steps in other embodiments of this application, and vice versa.

S201. The base station sends, at a first moment, uplink grant (UL GRANT) information to a terminal that is to perform uplink data transmission.

S202. The base station sends, at a second moment, downlink data to a terminal that is to perform downlink data transmission, where the second moment is a moment at which the terminal that is to perform uplink data transmission sends uplink data after receiving the uplink grant information at the first moment.

Optionally, the base station may send indication information in downlink control information, and the terminal that is to perform downlink transmission determines the second moment according to the indication information, and receives the downlink data at the second moment.

For details, refer to other embodiments of this application.

In this way, the base station delays, based on the moment at which the terminal that is to perform uplink data transmission sends the uplink data, sending of the downlink data to the terminal that is to perform downlink data transmission, so that the terminal that is to perform uplink data transmission and the terminal that is to perform downlink data transmission perform data transmission at a same moment and a same frequency, thereby improving spectrum resource utilization and saving resources.

FIG. 3 shows a scheduling method according to an embodiment of this application, and a base station and a terminal that are based on the method. For steps in this embodiment, reference may be made to corresponding steps in other embodiments of this application, and vice versa.

S301. A first terminal receives, at a first moment, downlink control information sent by the base station.

S302. The first terminal receives, at a second moment, downlink data sent by the base station, where the second moment is a moment at which a second terminal sends uplink data after receiving, at the first moment, uplink grant information sent by the base station, and the first terminal and the second terminal are terminals that are to perform uplink data transmission and downlink data transmission at a same moment and a same frequency.

In this way, after receiving the downlink control information, the first terminal delays receiving of the downlink data, so that the first terminal and the second terminal can perform uplink data transmission and downlink data transmission at a same moment and a same frequency, thereby improving spectrum utilization and saving resources.

FIG. 4 shows a scheduling method according to an embodiment of this application, and a base station and a terminal that are based on the method. For steps in this embodiment, reference may be made to corresponding steps in other embodiments of this application, and vice versa.

S401. A first terminal receives, at a first moment, downlink control information sent by the base station, where the downlink control information includes indication information.

S402. The first terminal determines, according to the indication information, to receive, at a second moment, downlink data sent by the base station, where the second moment is a moment at which a second terminal sends uplink data after receiving, at the first moment, uplink grant information sent by the base station, and the first terminal and the second terminal are terminals that are to perform uplink data transmission and downlink data transmission at a same moment and a same frequency.

For the indication information, refer to other embodiments of this application.

In this way, the first terminal delays receiving of the downlink data according to the indication information in the downlink control information, so that the first terminal and the second terminal perform uplink data transmission and downlink data transmission at a same moment and a same frequency, thereby improving spectrum utilization and saving resources.

FIG. 5 shows a scheduling method according to an embodiment of this application, and a base station and a terminal that are based on the method. For steps in this embodiment, reference may be made to corresponding steps in other embodiments of this application, and vice versa.

S501. A first terminal receives, at a first moment, downlink control information sent by the base station, where the downlink control information includes indication information, and the indication information is used to instruct to receive downlink data in an $n^{th}$ subframe after a current subframe.

S502. The first terminal receives the downlink data in the $n^{th}$ subframe, where the $n^{th}$ subframe is determined by the base station based on a second moment at which a second terminal sends uplink data after receiving, at the first moment, uplink grant information sent by the base station, and the first terminal and the second terminal are terminals that are to perform uplink data transmission and downlink data transmission at a same moment and a same frequency.

In this way, after receiving the downlink control information, the first terminal receives the downlink data in the $n^{th}$ subframe after the current subframe according to the indication information, so that the first terminal and the second terminal perform uplink data transmission and downlink transmission at a same moment and a same frequency, thereby improving spectrum utilization and saving resources.

Figure 6:
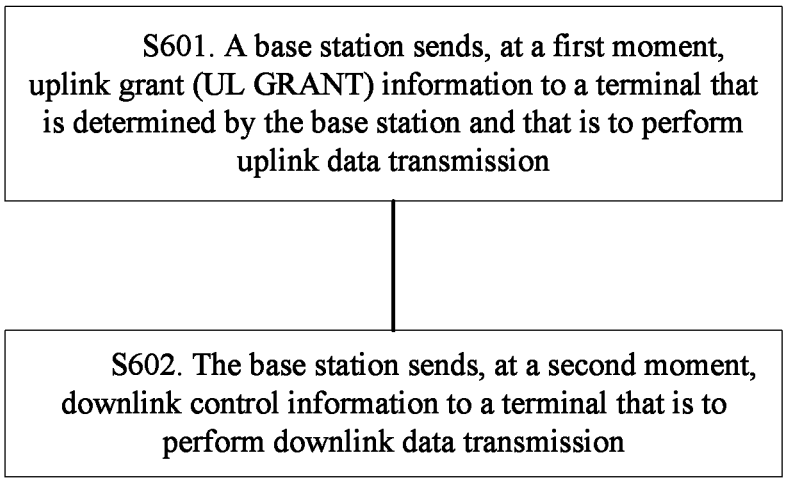
FIG. 6 shows a scheduling method according to an embodiment of this application.

FIG. 6 shows a scheduling method according to an embodiment of this application, and a base station and a terminal that are based on the method. For steps in this embodiment, reference may be made to corresponding steps in other embodiments of this application, and vice versa.

The base station determines that terminals are to perform uplink data transmission and downlink data transmission at a same moment and a same frequency.

Optionally, the terminals may be a same terminal having a full-duplex capability, and the terminal can perform uplink transmission and downlink transmission at a same moment and a same frequency. The terminal may be a terminal 1 having the full-duplex capability. The terminal having the full-duplex capability may also return to a half-duplex state, and this is not limited in this application.

Optionally, the terminals are two terminals determined by the base station, the two terminals are to perform uplink data transmission and downlink data transmission at a same moment and a same frequency, one of the two terminals is to perform uplink transmission, and the other terminal is to perform downlink transmission.

The base station uniformly manages the terminal that is to perform uplink (UL) data transmission or downlink (DL) data transmission. The base station selects a terminal for resource scheduling, and determines a matched terminal of the terminal based on a subframe transmission direction corresponding to a current scheduling decision-making moment of the terminal and a subframe transmission direction corresponding to a data transmission moment of the terminal.

In this application, a subframe transmission direction may be configured in advance to an uplink transmission direction or a downlink transmission direction, or may be both an uplink transmission direction and a downlink transmission direction.

The terminal that is to perform uplink transmission may be a terminal b, and a matched terminal of the terminal 2 may be a terminal 3 that is to perform downlink data transmission. Details are not described again in this application.

S601. The base station sends, at a first moment, uplink grant (UL GRANT) information to a terminal that is determined by the base station and that is to perform uplink data transmission.

After receiving the uplink grant information, the terminal that is to perform uplink data transmission sends uplink data at a second moment.

S602. The base station sends, at a second moment, downlink control information to a terminal that is to perform downlink data transmission.

The terminal that is to perform downlink data transmission is a terminal that performs data transmission at a same moment and a same frequency as the terminal that is to perform uplink data transmission.

The terminals in S601 and S602 may be the same terminal 1 having the full-duplex capability.

Alternatively, the terminals in S601 and S602 may be the terminal 2 and the terminal 3 that perform data transmission at a same moment and a same frequency.

The second moment is a moment at which the terminal that is to perform uplink data transmission sends the uplink data.

In this way, the base station determines the terminals that are to perform uplink data transmission and downlink data transmission at a same moment and a same frequency, and delays sending of the downlink control information to a matched terminal based on the moment at which the terminal that is to perform uplink data transmission sends the uplink data, so that the terminals that are to perform uplink data transmission and downlink data transmission perform data transmission at a same moment and a same frequency, thereby improving spectrum resource utilization.

Figure 7:
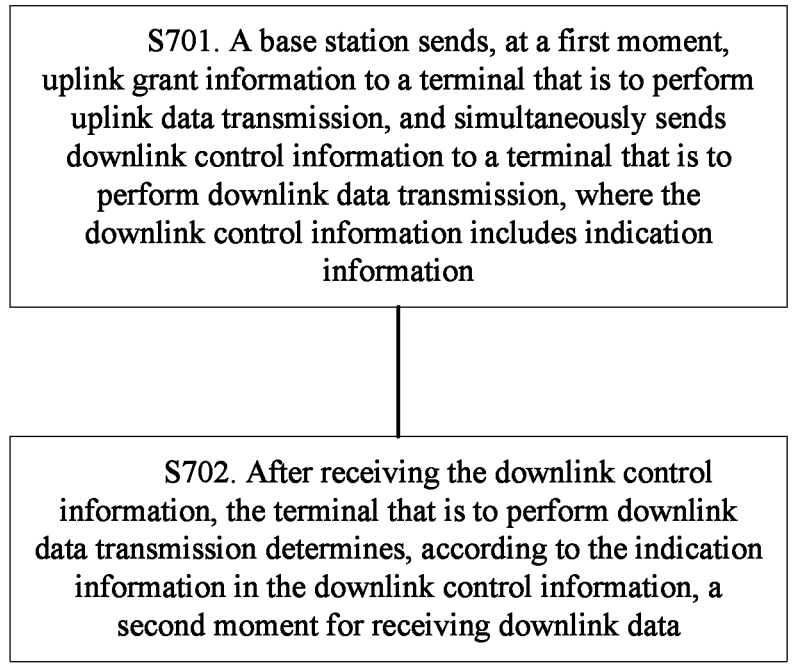
FIG. 7 shows a scheduling method according to an embodiment of this application.

FIG. 7 shows a scheduling method according to an embodiment of this application, and a base station and a terminal that are based on the method. For steps in this embodiment, reference may be made to corresponding steps in other embodiments of this application, and vice versa.

S701. The base station sends, at a first moment, uplink grant information to a terminal that is to perform uplink data transmission, and simultaneously sends downlink control information to a terminal that is to perform downlink data transmission, where the downlink control information includes indication information.

Referring to FIG. 6, the base station may simultaneously send the uplink grant information and the downlink control information to a terminal 1 having a full-duplex capability.

Alternatively, if a terminal 2 is the terminal that is to perform uplink data transmission, and a terminal 3 is the terminal that is to perform downlink data transmission, the base station sends the uplink grant information to the terminal 2 that is to perform uplink data transmission, and simultaneously sends the downlink control information to the terminal 3 that is to perform downlink data transmission.

The downlink control information includes the indication information. For example, a field may be added to downlink control information (DCI), to provide indication.

There is a terminal having an FDD capability, a terminal having a TDD capability, and a terminal having an FD capability in a network.

If the indication information is not delivered in the DCI, it indicates that currently half-duplex transmission applies. After receiving the downlink control information, the terminal that is to perform downlink data transmission receives downlink transmission data in real time according to a procedure in an FDD/TDD communications technology.

Alternatively, if the indication information is delivered in the DCI, and the indication information may be used to indicate a non-FD state, it indicates that currently half-duplex transmission applies, and after receiving the downlink control information, the terminal that is to perform downlink data transmission receives downlink transmission data in real time according to a procedure in an FDD/TDD communications technology. Alternatively, the indication information may be used to indicate at least one of the following content: information used to indicate that the terminal that is to perform uplink transmission at a same moment and a same frequency as the terminal receiving the indication information is a terminal having a full-duplex transmission capability, that is, the indication information may be used to instruct the terminal that is to perform uplink transmission to perform data transmission by using an FD subframe; or indication information that may be used to indicate that the terminal receiving the indication information is in a full-duplex FD state, and after receiving the indication information, the terminal determines, based on a time interval between a moment for receiving the uplink grant information by using an FD subframe and a moment for performing uplink data transmission, a time interval between a moment for receiving the downlink control information and a moment for receiving the downlink transmission data. Optionally, for the indication information, a 1-bit field may be added to the DCI, to provide indication, and this is not limited in this application.

For example, the indication information is delivered in the DCI, where the indication information may be used to indicate at least one of the following content: information used to indicate that the terminal receiving the indication information is in a full-duplex state; or information used to indicate that the terminal that is to perform uplink transmission at a same moment and a same frequency as the terminal receiving the indication information is a terminal having a full-duplex transmission capability. Optionally, if the indication information does not indicate an uplink-downlink part configuration relationship of a subframe for the terminal that is to perform uplink transmission, it is considered by default that the terminal that is to perform uplink transmission uses an FD subframe design. After receiving the indication information, the terminal determines, based on a time interval between a moment for receiving the uplink grant information by using an FD subframe and a moment for performing uplink data transmission, a time interval between a moment for receiving the downlink control information and a moment for receiving downlink transmission data. Optionally, for the indication information, a 1-bit field may be added to the DCI, to provide indication, and this is not limited in this application.

Alternatively, the indication information is delivered in the DCI, where the indication information is used to indicate that the terminal that is to perform uplink transmission at a same moment and a same frequency as the terminal receiving the indication information is a terminal having a full-duplex capability, and indicate an uplink-downlink part configuration relationship of a subframe for the terminal that is to perform uplink transmission; or the indication information is used to indicate that the terminal receiving the indication information is in a full-duplex state, and indicate an uplink-downlink part configuration relationship of a subframe for the terminal that is to perform uplink transmission; or the indication information is used to indicate the terminal that is to perform uplink transmission at a same moment and a same frequency as the terminal receiving the indication information is a terminal having a full-duplex capability, indicate that the terminal receiving the indication information is in a full-duplex state, and indicate an uplink-downlink part configuration relationship of a subframe for the terminal that is to perform uplink data transmission. The uplink-downlink part configuration relationship of the subframe is a configuration relationship between a part used for downlink data transmission and a part used for uplink data transmission in the subframe. The uplink-downlink part configuration relationship of the subframe may be used to indicate seven configurations in a TDD system; or the uplink-downlink part configuration relationship of the subframe may be used to indicate a subframe used for uplink transmission or a subframe used for downlink transmission in an FDD system; or the uplink-downlink part configuration relationship of the subframe may be used to indicate an FD subframe used in an FD system. Further, the indication information is further used to indicate that the terminal receiving the indication information is in the full-duplex state. This is not limited in this application. After receiving the downlink control information, the terminal that is to perform downlink data transmission determines, according to the indication information, a time interval between a current subframe and a subframe in which data transmission is to be performed, and determines a moment for receiving downlink transmission data. Optionally, in the indication information, a 1-bit information element may be used to indicate that the terminal that is to perform uplink transmission at the same moment and the same frequency as the terminal receiving the indication information is in the full-duplex state. In the indication information, a 3-bit information element may be used to indicate the uplink-downlink part configuration relationship of the subframe for the terminal that is to perform uplink transmission. This is not limited in this application.

Alternatively, the indication information is delivered in the DCI, where the indication information is used to indicate an uplink-downlink part configuration relationship of a subframe for the terminal that is to perform uplink transmission. The uplink-downlink part configuration relationship of the subframe is a configuration relationship between a part used for downlink data transmission and a part used for uplink data transmission in the subframe. The uplink-downlink part configuration relationship of the subframe may be used to indicate seven configurations in a TDD system; or the uplink-downlink part configuration relationship of the subframe may be used to indicate a subframe used for uplink transmission or a subframe used for downlink transmission in an FDD system; or the uplink-downlink part configuration relationship of the subframe may be used to indicate an FD subframe used in an FD system.

Alternatively, the indication information is delivered in the DCI, to instruct to receive the downlink data in an $n^{th}$ subframe after a current subframe.

S702. After receiving the downlink control information, the terminal that is to perform downlink data transmission determines, according to the indication information in the downlink control information, a second moment for receiving the downlink data.

Optionally, the indication information is used to indicate a non-FD state, and the terminal that is to perform downlink data transmission receives, according to the indication information, downlink data information at a same moment of receiving the downlink control information.

Optionally, the indication information is used to indicate that the terminal that is to perform uplink transmission at a same moment and a same frequency as the terminal receiving the indication information is a terminal having a full-duplex transmission capability, or indicate that the terminal receiving the indication information is in a full-duplex state, and the terminal that is to perform downlink data transmission determines, based on a time interval between a moment for receiving the uplink grant information by using an FD subframe and a moment for performing uplink data transmission, the second moment for receiving the downlink data.

Optionally, the indication information is used to indicate that the terminal that is to perform uplink transmission at a same moment and a same frequency as the terminal receiving the indication information is a terminal having a full-duplex capability, indicate that the terminal receiving the indication information is in a full-duplex state, and indicate an uplink-downlink part configuration relationship of a subframe for the terminal that is to perform uplink transmission; or the indication information is used to indicate that the terminal that is to perform uplink transmission at a same moment and a same frequency as the terminal receiving the indication information is a terminal having a full-duplex capability, and indicate an uplink-downlink part configuration relationship of a subframe for the terminal that is to perform uplink transmission; or the indication information is used to indicate that the terminal receiving the indication information is in a full-duplex state and indicate an uplink-downlink part configuration relationship of a subframe for the terminal that is to perform uplink transmission. The terminal that is to perform downlink data transmission determines, according to the indication information, a time interval between a current subframe and a subframe at which data transmission is to be performed, and determines the second moment for receiving the downlink data. The terminal that is to perform downlink data transmission may further determine a transmission direction of the current subframe and a transmission direction of the subframe at which data transmission is to be performed. This is not limited in this application.

Optionally, the indication information is used to indicate an uplink-downlink part configuration relationship of a subframe for the terminal that is to perform uplink transmission, and the terminal that is to perform downlink data transmission determines, according to the indication information, a time interval between a current subframe and a subframe at which data transmission is to be performed, and determines the second moment for receiving the downlink data. The terminal that is to perform downlink data transmission may further determine a transmission direction of the current subframe and a transmission direction of the subframe at which data transmission is to be performed. This is not limited in this application.

Optionally, the terminal that is to perform downlink data transmission receives the downlink data in the $n^{th}$ subframe after the current subframe according to the indication information.

In this way, the base station simultaneously sends the uplink grant information and the downlink control information to the terminal that is to perform uplink transmission and the terminal that is to perform downlink transmission, and delays sending of the downlink information to the terminal that is to perform downlink transmission, so that the terminal that is to perform uplink transmission and the terminal that is to perform downlink transmission perform data transmission at a same moment and a same frequency, thereby improving spectrum resource utilization.

FIG. 8 shows a scheduling method according to an embodiment of this application, and a base station and a terminal that are based on the method. For steps in this embodiment, reference may be made to corresponding steps in other embodiments of this application, and vice versa.

S801. The base station sends, at a first moment, uplink grant information to a terminal that is to perform uplink data transmission, and simultaneously sends downlink control information to a terminal that is to perform downlink data transmission, where the downlink control information includes indication information, and the indication information is used to instruct to receive data in an $n^{th}$ subframe after a current subframe.

The terminal that is to perform uplink data transmission receives the uplink grant information at the first moment and sends uplink data at a second moment.

The downlink control information includes the indication information, where the indication information is used to instruct to receive the data in the $n^{th}$ subframe after the current subframe, and the $n^{th}$ subframe is determined by the base station based on the second moment at which the terminal that is to perform uplink data transmission sends the uplink data after receiving, at the first moment, the uplink grant information sent by the base station.

Optionally, the $n^{th}$ subframe may be an $n^{th}$ downlink subframe or a full-duplex subframe. To be specific, the indication information is used to instruct to receive the data in an $n^{th}$ downlink subframe after the current subframe or in a full-duplex subframe.

Optionally, a field is added to the downlink control information, to provide instruction.

S802. After receiving the downlink control information, the terminal that is to perform downlink data transmission receives the data in the $n^{th}$ subframe after the current subframe according to the indication information in the downlink control information.

In this way, the base station sends the indication information, to instruct the terminal that is to perform downlink transmission to receive, after receiving the downlink control information, the data in the $n^{th}$ subframe, so that the terminal that is to perform uplink data transmission and the terminal that is to perform downlink data transmission perform data transmission at a same moment and a same frequency, thereby improving spectrum resource utilization.

The foregoing describes the solutions provided in the embodiments of this application mainly from a perspective of interaction between network elements. It may be understood that, to implement the foregoing functions, each network element, such as the terminal or the base station, includes a corresponding hardware structure and/or a software module for performing each function. A person skilled in the art should easily be aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

FIG. 9 is a possible schematic structural diagram of a base station related to the foregoing embodiments.

The base station includes a transmitter/receiver (transceiver) 901, a controller/processor 902, a memory 903, and a communications unit 904. The transmitter/receiver 901 is configured to support the base station in sending information to and receiving information from the terminal in the foregoing embodiments, and support the terminal in performing wireless communication with another terminal. The controller/processor 902 performs various functions for communicating with the terminal. In an uplink direction, an uplink signal from the terminal is received by an antenna, demodulated by the receiver 901, and further processed by the controller/processor 902, so as to restore service data and signaling information that are sent by the terminal. In a downlink direction, service data and a signaling message are processed by the controller/processor 902, and demodulated by the transmitter 901 to generate a downlink signal, and the downlink signal is sent by the antenna to the terminal. The controller/processor 902 further performs a processing procedure related to the base station in FIG. 1a to FIG. 8 and/or other processes of the technologies described in this application. The memory 903 is configured to store program code and data of the base station. The communications unit 904 is configured to support the base station in communicating with another network entity.

It may be understood that FIG. 9 shows only a simplified design of the base station. In actual application, the base station may include any quantity of transmitters, receivers, processors, controllers, memories, communications units, and the like, and all base stations that can implement this application fall within the protection scope of this application.

Figure 10:
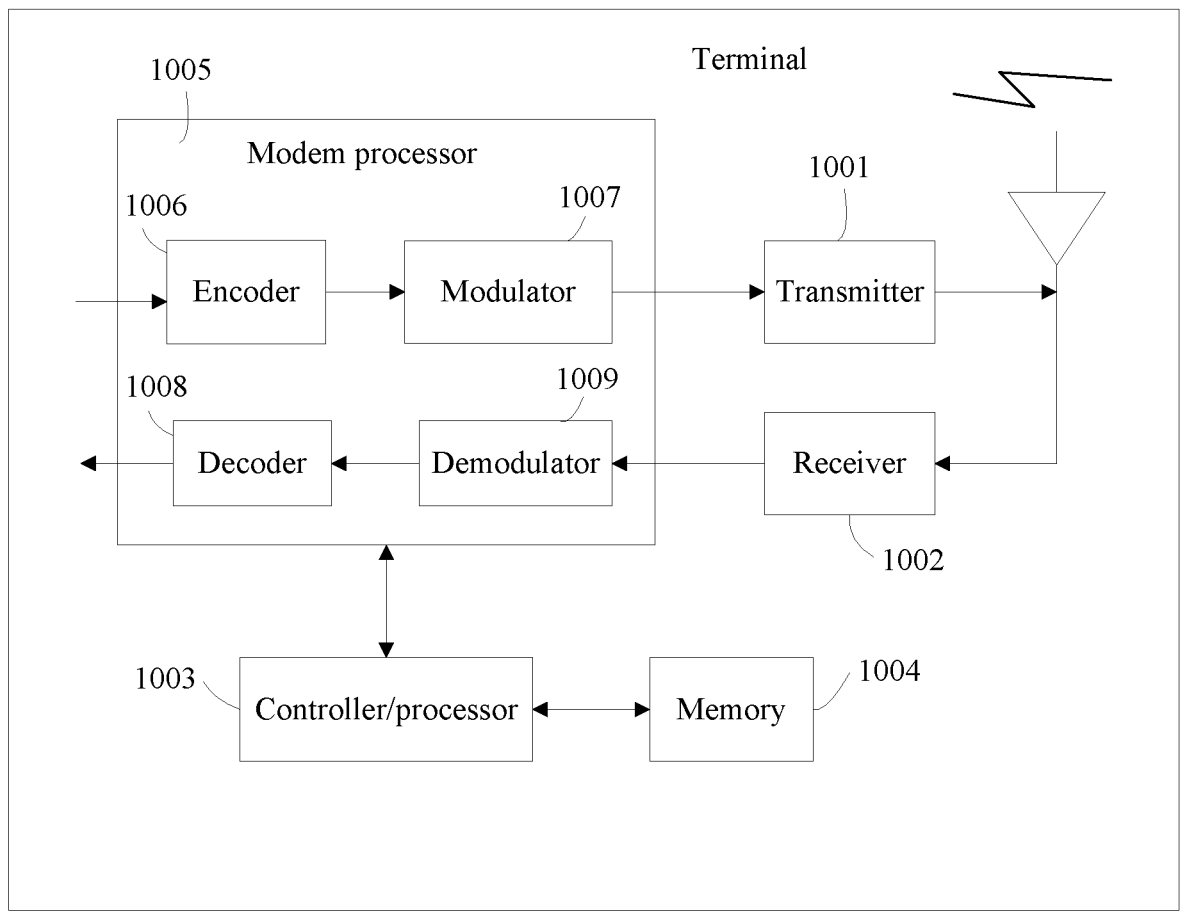
FIG. 10 is a possible schematic structural diagram of a terminal related to the foregoing embodiments.

FIG. 10 is a possible schematic structural diagram of a terminal related to the foregoing embodiments. The terminal includes a transmitter 1001, a receiver 1002 (or a transceiver), a controller/processor 1003, a memory 1004, and a modem processor 1005.

The transmitter 1001 adjusts (for example, analog conversion, wave filtering, amplification, and up-conversion) the output sampling and generates an uplink signal. The uplink signal is transmitted by an antenna to the base station in the foregoing embodiments. In a downlink direction, the antenna receives a downlink signal transmitted by the base station in the foregoing embodiments. The receiver 1002 adjusts (for example, performs wave filtering, amplification, down-conversion, and digitization on) a signal received from the antenna and provides input sampling. In the modem processor 1005, an encoder 1006 receives service data and a signaling message that are to be sent in an uplink direction, and processes (for example, performs formatting, encoding, and interleaving on) the service data and the signaling message. A modulator 1007 further processes (for example, performs symbol mapping and modulation on) the encoded service data and signaling message, and provides the output sampling. A demodulator 1009 processes (for example, demodulates) the input sampling and provides symbol estimation. A decoder 1008 processes (for example, de-interleaves and decodes) the symbol estimation, and provides decoded data and signaling message for the terminal. The encoder 1006, the modulator 1007, the demodulator 1009, and the decoder 1008 may be implemented by the composite modem processor 1005. These units perform processing based on a radio access technology (such as an access technology of LTE or another evolved system) that is used by a radio access network.

The controller/processor 1003 controls and manages actions of the terminal, and is configured to perform processing that is performed by the terminal in the foregoing embodiments, for example, configured to control the terminal to determine, according to indication information, a moment for receiving downlink data.

Figure 11:
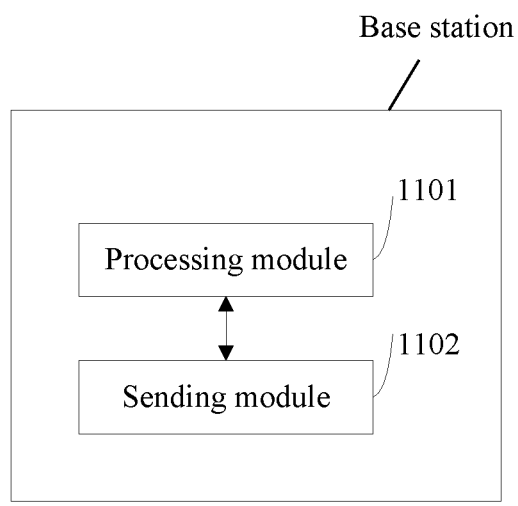
FIG. 11 is a possible schematic structural diagram of a base station related to the foregoing embodiments.

FIG. 11 is a possible schematic structural diagram of a base station related to the foregoing embodiments.

The base station includes a processing module 1101 and a sending module 1102.

The processing module 1101 is configured to instruct the sending module 1102 to perform the following functions.

The sending module 1102 is configured to send, at a first moment, uplink grant (UL GRANT) information to a terminal that is determined by the base station and that is to perform uplink data transmission.

The sending module 1102 is further configured to send, at a second moment, downlink data to a determined terminal that is to perform downlink data transmission, where the second moment is a moment at which the determined terminal that is to perform uplink data transmission sends uplink data after receiving the uplink grant information at the first moment.

The base station may be configured to perform corresponding operations in the foregoing embodiments, and details are not described herein again in this application.

The sending module is further configured to send, at the second moment, downlink control information to the determined terminal that is to perform downlink data transmission.

Optionally, the sending module is further configured to send, at the first moment, downlink control information to the determined terminal that is to perform downlink data transmission, where the downlink control information includes indication information, and the indication information is used to indicate at least one of the following content: information used to indicate that the terminal that is determined by the base station and that is to perform uplink data transmission is a terminal having a full-duplex capability, or information used to indicate that the terminal that is determined by the base station and that is to perform downlink data transmission is in a full-duplex state.

Optionally, the sending module is further configured to send, at the first moment, downlink control information to the determined terminal that is to perform downlink data transmission, where the downlink control information includes indication information, and the indication information is used to indicate an uplink-downlink part configuration relationship of a subframe for the terminal that is determined by the base station and that is to perform uplink transmission. The uplink-downlink part configuration relationship of the subframe includes a configuration relationship between a part used for downlink data transmission and a part used for uplink data transmission in the subframe. The indication information is further used to indicate at least one of the following content: information further used to indicate that the terminal that is determined by the base station and that is to perform uplink data transmission is a terminal having a full-duplex capability; or information further used to indicate that the terminal that is determined by the base station and that is to perform downlink data transmission is in a full-duplex state.

Optionally, the sending module is further configured to send, at the first moment, downlink control information to the determined terminal that is to perform downlink data transmission, where the downlink control information includes indication information, and the indication information is used to instruct to receive downlink data in an $n^{th}$ subframe after a current subframe.

In this way, the base station delays, based on the moment at which the terminal that is to perform uplink data transmission sends the uplink data, sending of the downlink data to the terminal that is to perform downlink data transmission, so that the terminal that is to perform uplink data transmission and the terminal that is to perform downlink data transmission perform data transmission at a same moment and a same frequency, thereby improving spectrum resource utilization and saving resources.

Figure 12:
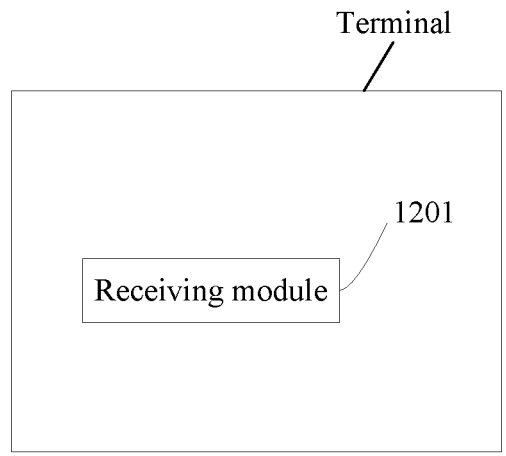
FIG. 12 is a possible schematic structural diagram of a terminal related to the foregoing embodiments.

FIG. 12 is a possible schematic structural diagram of a terminal related to the foregoing embodiments.

The terminal includes a receiving module 1201.

The receiving module 1201 is configured to receive, at a first moment, downlink control information sent by a base station.

The receiving module 1201 is further configured to receive, at a second moment, downlink data sent by the base station, where the second moment is a moment at which a second terminal sends uplink data after receiving, at the first moment, uplink grant information sent by the base station, and the terminal and the second terminal are terminals that are to perform uplink data transmission and downlink data transmission at a same moment and a same frequency.

The terminal may be configured to perform corresponding operations in the foregoing embodiments, and details are not described herein again in this application.

In this way, a terminal that is to perform downlink data transmission and a terminal that is to perform uplink data transmission perform uplink data transmission and downlink data transmission at a same moment and a same frequency, thereby effectively improving spectrum utilization and saving resources.

Figure 13:
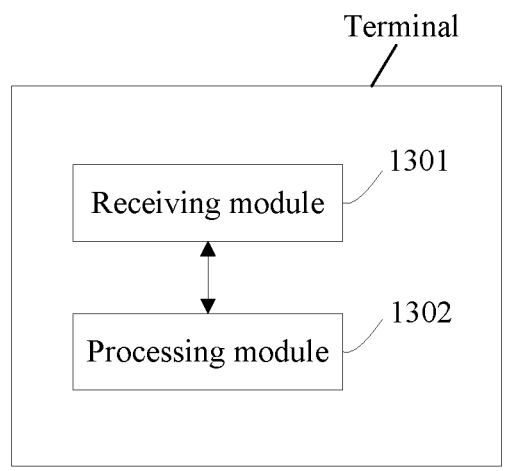
FIG. 13 is a possible schematic structural diagram of a terminal related to the foregoing embodiments.

FIG. 13 is a possible schematic structural diagram of a terminal related to the foregoing embodiments.

The terminal includes a receiving module 1301 and a processing module 1302.

The receiving module 1301 is configured to receive, at a first moment, downlink control information sent by a base station, where the downlink control information includes indication information.

The processing module 1302 is configured to determine, according to the indication information, to receive, at a second moment, downlink data sent by the base station, where the second moment is a moment at which a second terminal sends uplink data after receiving, at the first moment, uplink grant information sent by the base station, and the terminal and the second terminal are terminals that are determined by the base station and that are to perform uplink data transmission and downlink data transmission at a same moment and a same frequency.

The terminal may be configured to perform corresponding operations in the foregoing embodiments, and details are not described herein again in this application.

The indication information is used to indicate at least one of the following content: information used to indicate that a terminal that is determined by the base station and that is to perform uplink data transmission is a terminal having a full-duplex capability, or information used to indicate that a terminal that is determined by the base station and that is to perform downlink data transmission is in a full-duplex state.

The processing module is configured to determine, based on a time interval between a moment for receiving the uplink grant information by using a full-duplex FD subframe and a moment for performing uplink data transmission, to receive, at the second moment, the downlink data sent by the base station.

Alternatively, the indication information is used to indicate an uplink-downlink part configuration relationship of a subframe of the second terminal, where the uplink-downlink part configuration relationship of the subframe includes a configuration relationship between a part used for downlink data transmission and a part used for uplink data transmission in the subframe. The processing module is configured to determine, according to the indication information, a time interval between a current subframe and a subframe in which data transmission is to be performed, and determine to receive, at the second moment, the downlink data sent by the base station. Optionally, the indication information is further used to indicate at least one of the following content: information further used to indicate that a terminal that is determined by the base station and that is to perform uplink data transmission is a terminal having a full-duplex capability; or information further used to indicate that a terminal that is determined by the base station and that is to perform downlink data transmission is in a full-duplex state.

Optionally, the indication information is used to instruct to receive the downlink data in an $n^{th}$ subframe after a current subframe.

In this way, the terminal that is to perform downlink data transmission and the terminal that is to perform uplink data transmission perform uplink data transmission and downlink data transmission at a same moment and a same frequency according to the indication information, thereby effectively improving spectrum utilization and saving resources.

Figure 14:
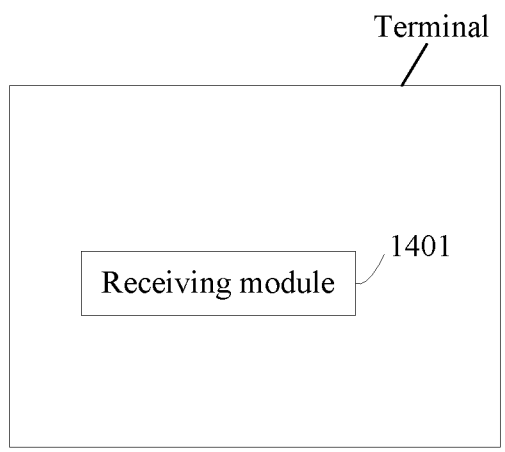
FIG. 14 is a possible schematic structural diagram of a terminal related to the foregoing embodiments.

FIG. 14 is a possible schematic structural diagram of a terminal related to the foregoing embodiments.

The terminal includes a receiving module 1401.

The receiving module 1401 is configured to receive, at a first moment, downlink control information sent by a base station, where the downlink control information includes indication information, and the indication information is used to instruct to receive downlink data in an $n^{th}$ subframe after a current subframe.

The receiving module 1401 is further configured to receive the downlink data in the $n^{th}$ subframe, where the $n^{th}$ subframe is determined by the base station based on a second moment at which a second terminal sends uplink data after receiving, at the first moment, uplink grant information sent by the base station, and the terminal and the second terminal are terminals that are determined by the base station and that are to perform uplink data transmission and downlink data transmission at a same moment and a same frequency.

The terminal may be configured to perform corresponding operations in the foregoing embodiments, and details are not described herein again in this application.

In this way, a terminal that is to perform downlink data transmission and a terminal that is to perform uplink data transmission perform uplink data transmission and downlink data transmission at a same moment and a same frequency according to the indication information, thereby effectively improving spectrum utilization and saving resources.

The foregoing embodiments may be combined with each other, and reference may be made to each other. For ease and brevity of description, details are not described herein again.

The controller/processor configured to perform functions of the base station, the terminal, or a core network apparatus in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof The controller/processor may implement or execute various example logical blocks, modules, and circuits described with reference to content disclosed in this application. Alternatively, the processor may be a combination for implementing a computing function, for example, a combination of one or more microprocessors, or a combination of a DSP and a microprocessor.

Method or algorithm steps described in combination with the content disclosed in this application may be implemented by hardware, or may be implemented by a processor executing a software instruction. The software instruction may be provided by a corresponding software module, and the software module may be located in a RAM, a flash, a ROM, an EPROM, an EEPROM, a register, a hard disk, a removable hard disk, a CD-ROM, or a storage medium in any other form known in the art. In an example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal. Certainly, the processor and the storage medium may exist as discrete components in a terminal.

A person skilled in the art should be aware that, in the foregoing one or more examples, functions described in this application may be implemented by hardware, software, firmware, or any combination thereof. When being implemented by software, these functions may be stored in a computer-readable medium or transmitted as one or more instructions or as code in the computer-readable medium. The computer-readable medium includes a computer storage medium and a communications medium, where the communications medium includes any medium that enables a computer program to be transmitted from one place to another place. The storage medium may be any usable medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A scheduling method, comprising:
   sending, by a base station at a first moment, downlink control information to a first terminal for downlink data transmission, wherein the downlink control information comprises indication information;
   sending, by the base station at the first moment, uplink grant information to a second terminal for uplink data transmission; and
   sending, by the base station at a second moment, downlink data to the first terminal, wherein the second moment is a moment at which the base station receives uplink data from the second terminal after the second terminal receives the uplink grant information at the first moment; wherein the indication information includes at least one of the following:
information that indicates that the second terminal has a full-duplex capability; or
information that indicates that the first terminal is in a full-duplex state.

2. The method according to claim 1, wherein:
the indication information indicates an uplink-downlink part configuration relationship of a subframe for the terminal that is to perform uplink data transmission.

3. The method according to claim 2, wherein the uplink-downlink part configuration relationship of the subframe comprises a configuration relationship between a part used for downlink data transmission and a part used for uplink data transmission in the subframe.

4. The method according to claim 1, wherein
the indication information is used to instruct to receive the downlink data in an $n^{th}$ subframe after a current subframe.

5. The method according to claim 1, wherein
the second terminal and the first terminal are a same terminal that performs uplink transmission and downlink transmission at a same moment and a same frequency; or
the second terminal and the first terminal are two different terminals, and the two different terminals perform uplink transmission and downlink transmission at a same moment and a same frequency.

6. A scheduling method, comprising:
receiving, by a first terminal for downlink data transmission, downlink control information from a base station at a first moment, wherein the downlink control information comprises indication information, wherein the indication information includes at least one of the following: information that indicates that a second terminal for uplink data transmission has a full-duplex capability, or information that indicates that the first terminal is in a full-duplex state; and
determining, by the first terminal according to the indication information, to receive, at a second moment, downlink data from the base station, wherein the second moment is a moment at which the second terminal sends uplink data after receiving uplink grant information from the base station at the first moment, and the first terminal and the second terminal are terminals that are to perform data transmission within a same moment and at a same frequency,
wherein the determining, by the first terminal according to the indication information, to receive, at a second moment, downlink data from the base station comprises:
determining, by the first terminal based on a time interval between a moment for receiving the uplink grant information using a full-duplex FD subframe and a moment for performing uplink data transmission, to receive, at the second moment, the downlink data from the base station.

7. The method according to claim 6, wherein the indication information is used to instruct to receive the downlink data in an $n^{th}$ subframe after a current subframe.

8. An apparatus, comprising:
a memory, the memory configured to store a computer program instruction; and
at least one processor, the at least one processor configured to execute the computer program instruction stored in the memory to perform the following operations:
sending downlink control information to a first terminal for downlink data transmission at a first moment, wherein the downlink control information comprises indication information;
sending, uplink grant information to a second terminal for uplink data transmission at the first moment; and
sending, downlink data to the first terminal at a second moment, wherein the second moment is a moment at which the apparatus receives uplink data from the second terminal after the second terminal receives the uplink grant information at the first moment;
wherein the indication information includes at least one of the following: information that indicates that the second terminal has a full-duplex capability; or information that indicates that the first terminal is in a full-duplex state.

* * * * *